United States Patent
Tu et al.

(10) Patent No.: US 10,754,810 B2
(45) Date of Patent: Aug. 25, 2020

(54) INTERPOSER FOR PERIPHERAL COMPONENT INTERCONNECT EXPRESS GENERATION 4

(71) Applicant: VIAVI Solutions Inc., San Jose, CA (US)

(72) Inventors: Gao Tu, San Jose, CA (US); Wayne Perrier, San Jose, CA (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 16/232,755

(22) Filed: Dec. 26, 2018

(65) Prior Publication Data

US 2019/0205279 A1    Jul. 4, 2019

Related U.S. Application Data

(60) Provisional application No. 62/612,010, filed on Dec. 29, 2017.

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 9,122,481 | B2 * | 9/2015 | Unnikrishnan | G06F 1/3209 |
| 9,405,718 | B2 * | 8/2016 | Ranganathan | G06F 13/42 |
| 9,552,322 | B2 * | 1/2017 | Yeung | G06F 13/4221 |
| 9,846,189 | B2 * | 12/2017 | Mellitz | G01R 27/32 |
| 2016/0380393 | A1 * | 12/2016 | Wig | H05K 1/117 |
| | | | | 439/62 |
| 2017/0357609 | A1 * | 12/2017 | Long | G06F 13/16 |
| 2018/0165244 | A1 * | 6/2018 | Jimenez | G06F 13/4022 |
| 2018/0276176 | A1 * | 9/2018 | Wig | G06F 13/4068 |

* cited by examiner

*Primary Examiner* — Elias Mamo
(74) *Attorney, Agent, or Firm* — Harrity & Harrity, LLP

(57) ABSTRACT

An interposer for a Peripheral Component Interconnect Express (PCI-e) host device and a PCI-e target device may include a plurality of linear repeaters to perform repetition or crosspoint switching of signals en route from the PCI-e host device to the PCI-e target device or from the PCI-e target device to the PCI-e host device; and a plurality of interposer components, the plurality of interposer components to receive the signals from the plurality of linear repeaters or provide the signals to the plurality of linear repeaters, and at least one interposer component, of the plurality of interposer components, being associated with a resistance of at least 50 ohms. Thus, the interposer may be compliant with a PCI-e protocol, such as the PCI-e Gen 4 protocol.

20 Claims, 3 Drawing Sheets

_US 10,754,810 B2_

INTERPOSER FOR PERIPHERAL COMPONENT INTERCONNECT EXPRESS GENERATION 4

RELATED APPLICATION

This application claims priority under 35 U.S.C. § 119 to U.S. Provisional Patent Application No. 62/612,010, filed on Dec. 29, 2017, the content of which is incorporated by reference herein in its entirety.

BACKGROUND

The Peripheral Component Interconnect (PCI) protocol is a protocol for input/output (I/O) communication via a PCI bus, which may, for example, be implemented on a motherboard of a computer. The PCI bus supports the functions found on a processor bus but in a standardized format that is independent of any particular processor's native bus. The PCI protocol has evolved into the PCI Express (PCI-e) protocol, which provides benefits such as a higher throughput, reduced pin count, and better performance scaling in comparison to legacy PCI. Recently, PCI-e Generation 4 has been introduced, which can provide throughput of up to 16 gigatransfers per second (GT/s) per lane.

SUMMARY

An interposer for a Peripheral Component Interconnect Express (PCI-e) host device and a PCI-e target device may include a plurality of linear repeaters to perform repetition or crosspoint switching of signals en route from the PCI-e host device to the PCI-e target device or from the PCI-e target device to the PCI-e host device; and a plurality of interposer components, the plurality of interposer components to receive the signals from the plurality of linear repeaters or provide the signals to the plurality of linear repeaters, and at least one interposer component, of the plurality of interposer components, being associated with a resistance of at least 50 ohms.

A device may include at least one linear repeater to provide a signal using a Peripheral Component Interconnect Express (PCI-e) Generation 4 protocol, where the signal is en route from a PCI-e host device to a PCI-e target device or from the PCI-e target device to the PCI-e host device; and at least one interposer component to receive the signal, where the at least one interposer component includes one or more resistors to provide a threshold resistance associated with the PCI-e Generation 4 protocol.

An interposer for a Peripheral Component Interconnect Express (PCI-e) host device and a PCI-e target device may include at least one linear repeater to perform repetition or crosspoint switching of signals en route from the PCI-e host device to the PCI-e target device or from the PCI-e target device to the PCI-e host device; and at least one interposer component to provide a connection between the interposer and another device, the at least one interposer component to receive the signals from the at least one linear repeater or to provide the signals to the at least one linear repeater, and the at least one interposer component being associated with a threshold resistance associated with a PCI-e Generation X protocol, where X is greater than or equal to 4.

DETAILED DESCRIPTION

The following detailed description of example implementations refers to the accompanying drawings. The same reference numbers in different drawings may identify the same or similar elements.

A designer of a peripheral for a PCI-e bus may want to perform signal measurements with regard to data that is communicated via the PCI-e bus. For example, the designer may want to perform signal measurements without significantly impacting the data communicated via the PCI-e bus. To achieve this, the designer may use an instrument such as an interposer. An interposer is an electrical interface that can route between one socket or connection and another socket or connection. The purpose of an interposer is to reroute a connection to a different connection. In the case of the peripheral, the interposer may be situated between the peripheral and the PCI-e bus. The peripheral may enable measurement or injection of high speed signals of the PCI-e bus without significantly impacting functionality of the peripheral or the PCI-e bus.

However, the increased throughput associated with PCI-e Gen 4 (e.g., approximately 16 GT/s per lane) creates new challenges for instrument designers using the PCI-e Gen 4 protocol. For example, a designer who wants to create a working interposer for PCI-e Gen 4 may need to use high throughput chips, such as linear repeaters or linear equalizers that are capable of providing over 16 GT/s per lane. However, such a linear repeater or linear equalizer may not be compliant with the PCI-e protocol (e.g., the PCI-e Gen 4 protocol or an earlier protocol). For example, the PCI-e protocol may mandate a resistance threshold for channels of the PCI-e bus, and the PCI-e bus may not communicate with chips (e.g., linear repeaters or linear equalizers) that do not satisfy the resistance threshold.

Some implementations, described herein, provide a configuration for an interposer that includes differential pairs associated with a linear repeater or linear equalizer. The differential pairs may be coupled to one or more resistors so that the resistance threshold of the PCI-e standard is satisfied. Furthermore, a resistance of the resistor may be selected to reduce (e.g., minimize, optimize) distortion introduced by the resistor and/or the differential pair, which enables usage of the linear repeater or linear equalizer for measurement of high speed signals. Still further, this may enable the usage of high-performance linear repeaters or linear equalizers for such an interposer, which provides the ability to perform measurements of PCI-e Gen 4 buses. Thus, a linear repeater or linear equalizer that does not satisfy the resistance threshold of the PCI-e protocol can be used in an interposer for performing measurements or injection with regard to a PCI-e Gen 4 bus. In some implementations, the resistance of the resistor may be associated with a threshold resistance associated with a PCI-e Generation X protocol, where X is greater than or equal to 4.

Figure 1:
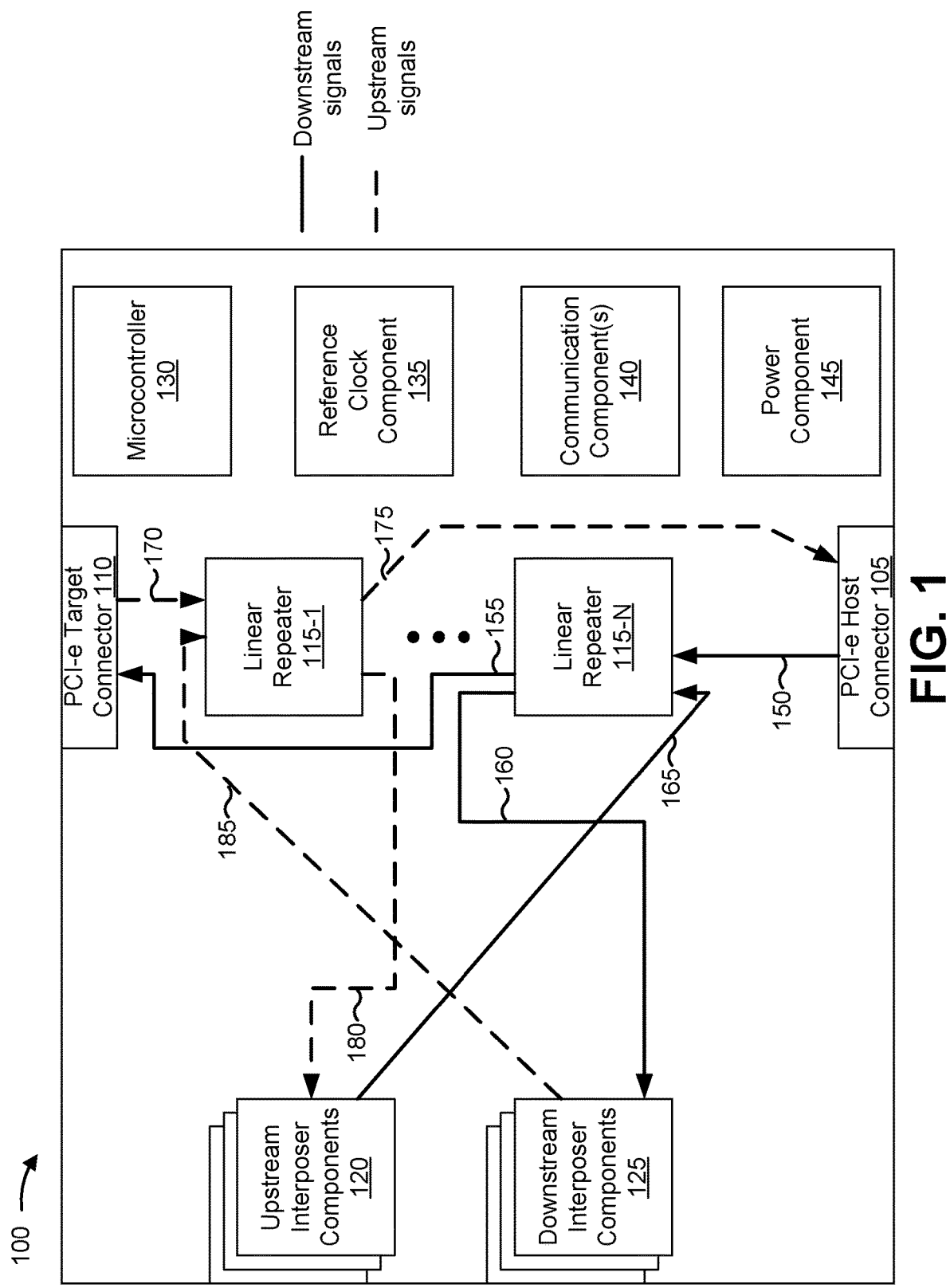
FIG. 1 is a diagram of an overview of an example interposer described herein.

FIG. 1 is a diagram of an overview of an example interposer 100 described herein. Interposer 100 may enable measurement or injection of signals between a PCI-e host device associated with PCI-e host connector 105 and a PCI-e target device associated with PCI-e target connector 110. For example, the PCI-e host device may include a motherboard, a computer device, a network device, and/or any other device capable of communicating using the PCI-e protocol (e.g., PCI-e Gen 4 and/or another PCI-e protocol). The PCI-e target device may include a peripheral, such as a graphic processing unit (GPU), a central processing unit (CPU), and/or any other device capable of communicating using the PCI-e protocol (e.g., PCI-e Gen 4 and/or another PCI-e protocol). In some implementations, PCI-e host connector 105 and/or PCI-e target connector 110 may include a PCI bus or a PCI-e bus and/or an interface with a PCI bus or a PCI-e bus. In some implementations, PCI-e host connector 105 and/or PCI-e target connector 110 may include a 16-lane bus or a different type of bus (e.g., an 8-lane bus, a 32-lane bus, etc.).

As shown, interposer 100 may include a plurality of linear repeaters 115-1 through 115-N. For example, when interposer 100 is associated with a 16-lane PCI-e connection, interposer 100 may include 8 linear repeaters 115-1 through 115-8. Linear repeater 115 includes a device (e.g., component, chip, etc.) capable of performing repetition and/or crosspoint switching of signals. In some implementations, linear repeater 115 may include, for example, a linear repeater, a linear redriver, a linear equalizer (e.g., a continuous time linear equalizer, etc.), and/or the like. In some implementations, linear repeater 115 may be associated with a particular throughput, such as a throughput greater than approximately 16 GT/s. In such a case, interposer 100 may be useable with PCI-e Gen 4. In some implementations, linear repeater 115 may not include a resistor that is configured to provide a threshold resistance indicated by the PCI-e Gen 4 standard. In some implementations, linear repeater 115 may be programmable or controllable using pin control, software (e.g., SMBus, Inter-integrated Circuit (I2C), etc.), and/or the like. For example, linear repeater 115 may be programmable or controllable by microcontroller 130.

As further shown, interposer 100 may include a plurality of upstream interposer components 120 and a plurality of downstream interposer components 125. As used herein, "downstream" refers to a direction of travel from PCI-e host connector 105 to PCI-e target connector 110, and "upstream" refers to a direction of travel from PCI-e target connector 110 to PCI-e host connector 105. Downstream signals are shown in FIG. 1 using solid lines and upstream signals are shown in FIG. 1 using dashed lines.

Upstream interposer component 120 and downstream interposer component 125 include a port and/or a connection to another device, such as a signal analyzer, a signal jammer or injector, a signal exerciser, and/or the like. For example, upstream interposer component 120 and/or downstream interposer component 125 may receive a signal from the other device (e.g., the signal jammer or injector), and may inject the signal for transmission to PCI-e host connector 105 or PCI-e target connector 110, as described in more detail below. Additionally, or alternatively, upstream interposer component 120 and/or downstream interposer component 125 may receive a signal from linear repeater 115, and may provide the signal to the other device (e.g., the signal analyzer). Additionally, or alternatively, upstream interposer component 120 and/or downstream interposer component 125 may perform a combination of the above functions (e.g., for a signal exerciser, an emulator, and/or the like).

Upstream interposer component 120 may include a plurality of differential pairs that may be connected to linear repeater 115, as shown and described in more detail in connection with FIG. 2, below. The lanes of each differential pair of upstream interposer component 120 may be associated with respective resistors, as also described in more detail in connection with FIG. 2, below. Since the respective resistors are included in the plurality of upstream interposer components 120, interposer 100 is capable of performing measurement for PCI-e Gen 4.

Downstream interposer component 125 may include a plurality of differential pairs that may be connected to linear repeater 115, as shown and described in more detail in connection with FIG. 3, below. The lanes of each differential pair of downstream interposer component 125 may be associated with respective resistors, as also described in more detail in connection with FIG. 3, below. Since the respective resistors are included in the plurality of downstream interposer components 125, interposer 100 is capable of performing measurement for PCI-e Gen 4.

Microcontroller 130 includes a controller or microcontroller, such as a programmable interface controller and/or the like. In some implementations, microcontroller 130 may include a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. In some implementations, microcontroller 130 includes one or more processors capable of being programmed to perform a function.

Reference clock component 135 includes one or more components to provide a reference clock for interposer 100. In some implementations, reference clock component 135 may include a clock multiplexer that is based on the reference clock for interposer 100. In some implementations, interposer 100 may include multiple, different reference clocks or reference clock components 135.

Communication component 140 includes one or more interfaces and/or components to perform inbound and/or outbound communications of interposer 100. For example, communication component 140 may include a connection, such as a microcoaxial (MCX) in connection, an MCX out connection, a J* connection (e.g., J22, J24, J16, J8, J42, J6, J3/J4, J8, etc.), an SW1 connection, and/or the like. In some implementations, communication component 140 may include an I2C expender, a general purpose input/output (GPIO) component, an indicator (e.g., a light emitting diode, a display, a speaker), and/or the like.

Power component 145 includes one or more interfaces and/or components that provide power to interposer 100. For example, power component 145 may include a power input and/or a power output, such as a power jack or a power supply.

Interposer 100 is capable of interposing PCI-e signals (e.g., for measurement, injection, etc.). For example, when linear repeater 115 is associated with a throughput higher than 16 GT/s, interposer 100 may be capable of interposing signals that use a PCI-e Gen 4 protocol. This may be possible based on the configuration of upstream interposer component 120 and downstream interposer component 125 (e.g., the resistors included in upstream interposer component 120 and downstream interposer component 125).

In the downstream direction, PCI-e host connector 105 may transmit a signal 150, which may include a PCI-e signal and/or the like. Linear repeater 115 may provide the signal 150 to PCI-e target connector 110 as signal 155. Additionally, linear repeater 115 may provide the signal 150 to downstream interposer component 125 as signal 160. For example, linear repeater 115 may duplicate the signal 150 to generate signals 155 and 160. In some implementations, linear repeater 115 may provide signal boost and/or equalization to signals 155 and/or 160 to compensate signal loss or distortion introduced by interposer 100. Downstream interposer component 125 or another component of interposer 100 (e.g., communication component 140) may output signal 160 (e.g., to an analyzer device, an exerciser device, etc.). In some implementations, upstream interposer component 120 may generate a downstream signal 165. For example, upstream interposer component 120 may generate the downstream signal 165 as an injected signal to PCI-e target connector 110. In such a case, linear repeater 115 may provide the downstream signal 165 as signal 155.

In the upstream direction, PCI-e target connector 110 may transmit a signal 170, which may include a PCI-e signal and/or the like. Linear repeater 115 may provide the signal 170 to PCI-e host connector 105 as signal 175. Additionally, linear repeater 115 may provide the signal 170 to upstream interposer component 125 as signal 180. For example, linear repeater 115 may duplicate the signal 170 to generate signals 175 and 180 (e.g., without significantly degrading the signal 170). Upstream interposer component 120 or another component of interposer 100 (e.g., communication component 140) may output signal 180 (e.g., to an analyzer device, an exerciser device, etc.). In some implementations, downstream interposer component 125 may generate a downstream signal 185. For example, downstream interposer component 125 may generate the downstream signal 185 as an injected signal to PCI-e host connector 105. In such a case, linear repeater 115 may provide the downstream signal 185 as signal 175.

As indicated above, FIG. 1 is provided merely as an example. Other examples are possible and may differ from what was described with regard to FIG. 1.

Figure 2:
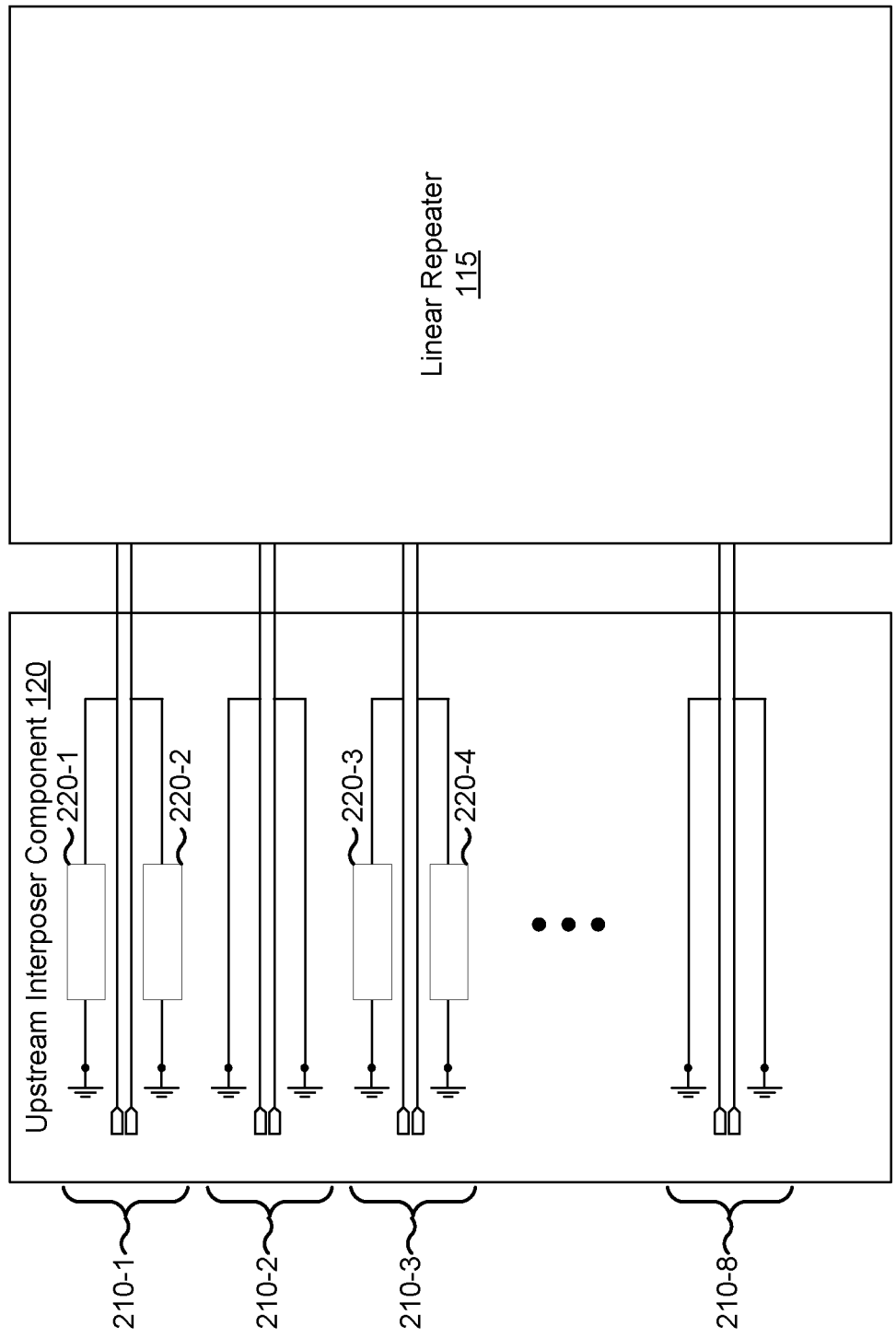
FIG. 2 is a diagram of an example of an upstream interposer component.

FIG. 2 is a diagram of an example 200 of an upstream interposer component 120. As shown, upstream interposer component 120 may include a plurality of differential pairs 210. Differential pair 210 may perform differential signaling to provide data to linear repeater 115. As shown, in some implementations, upstream interposer component 120 may include 8 differential pairs 210-1 through 210-8. For example, in a 16-lane PCI-e implementation, upstream interposer component 120 may include 8 differential pairs 210. In some implementations, upstream interposer component 120 may include a different number of differential pairs 210 (e.g., 4 differential pairs, 16 differential pairs, or a different number of differential pairs). In some implementations, differential pair 210 may include a positive (e.g., P) lane and a negative (e.g., N) lane.

In some implementations, differential pair 210 may receive a signal from a particular device or input. For example, differential pair 210 may receive a signal from a transmit (TX) port of PCI-e host connector 105 that is destined to a multiplexer of linear repeater 115 or interposer 100 (e.g., reference clock component 135). Additionally, or alternatively, differential pair 210 may receive a signal from another device (e.g., from a SFF8644 connector or another type of connector) that is to be provided or injected to a TX port of PCI-e target connector 110.

As shown, some differential pairs 210 may be associated with one or more resistors 220. For example, differential pair 210-1 includes a resistor 220-1 and 220-2. Resistor 220 may cause differential pair 210 to satisfy a resistance threshold of the PCI-e protocol. For example, a host PCI-e device and/or a target PCI-e device may not communicate with a device (e.g., interposer 100) that does not satisfy the resistance threshold. In some implementations, the resistance threshold may be, for example, 50 ohms. For example, the resistance of resistor 220 may be at least 50 ohms. In some implementations, differential pair 210 may include a single resistor 220 that provides the resistance for both lanes of differential pair 210.

In some implementations, the resistance of resistor 220 may be selected to improve performance of interposer 100. For example, a resistance value that is too low may cause distortion, and a resistance value that is too high may prevent signals from being recognized as PCI-e signals. In some implementations, the resistance of resistor 220 may be in a range of approximately 75 ohms to approximately 150 ohms. As a more particular example, the resistance of resistor 220 may be approximately 121 ohms. This may reduce distortion without blocking the signals entirely. In some implementations, the resistance of resistor 220 may be selected based on simulating performance of interposer 100 using different resistance values for resistor 220.

In some implementations, a differential pair 210 may not include a resistor. For example, differential pairs 210-2 and 210-8 do not include a resistor. Such a differential pair may be used to inject a signal, such as signals 165 and 185 of FIG. 1. Since the signal is injected and originates upstream from differential pair 210, no resistor is needed to enable communication with PCI-e target connector 110.

In some implementations, linear repeater 115 may have one or more differential pair outputs (not shown). For example, linear repeater 115 may output a signal from a multiplexer of linear repeater 115 or interposer 100 to a TX port of PCI-e target connector 110. Additionally, or alternatively, linear repeater 115 may output a signal from PCI-e host connector 105 to a particular connection, such as an SFF8644 component or any other connection or component.

In some implementations, upstream interposer component 120 may include additional components or circuitry, such as a power input, a control input for control data or clock information of upstream interposer component 120, a power output, a control output for control data or clock information, and/or the like.

As indicated above, FIG. 2 is provided merely as an example. Other examples are possible and may differ from what was described with regard to FIG. 2.

Figure 3:
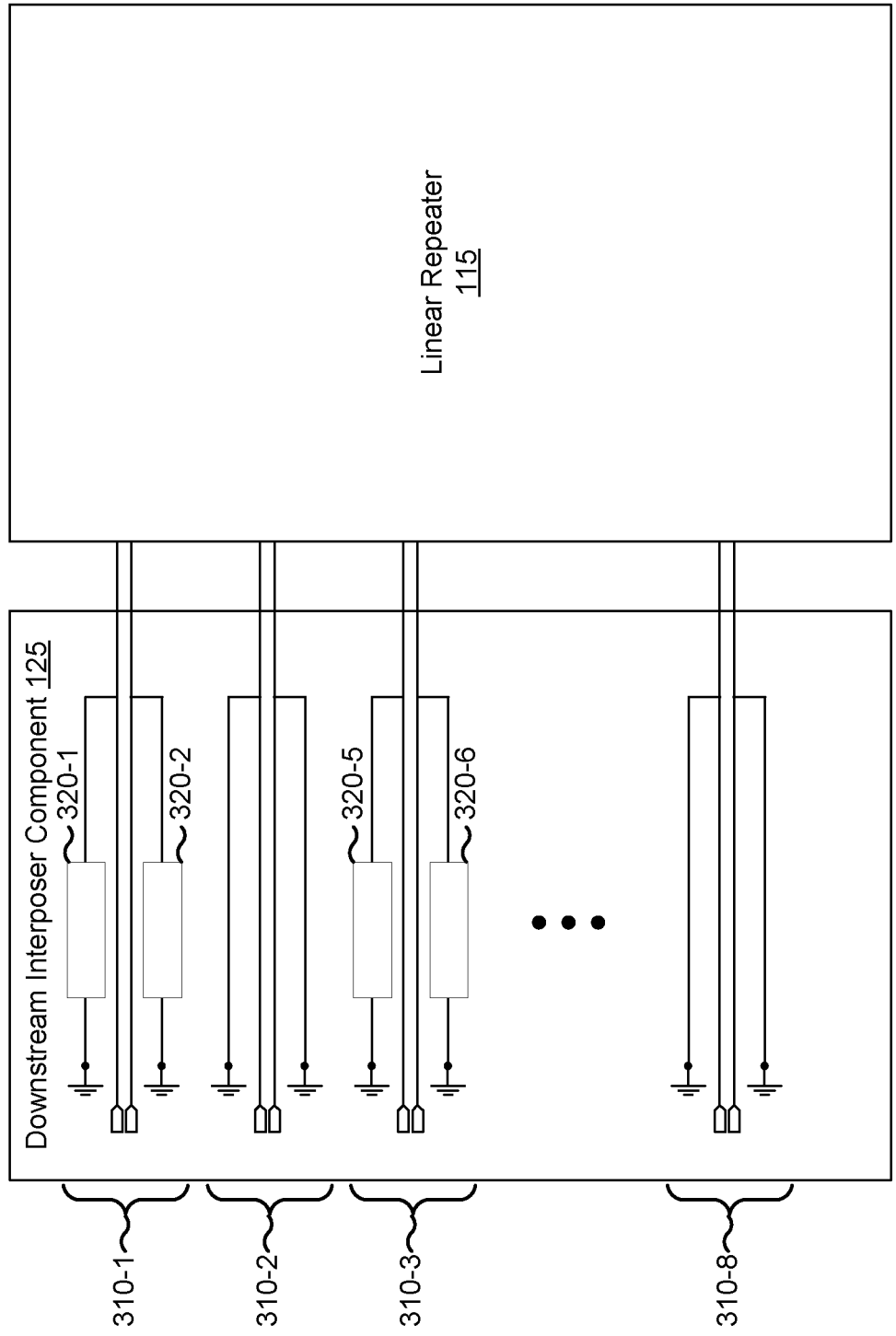
FIG. 3 is a diagram of an example of a downstream interposer component.

FIG. 3 is a diagram of an example 300 of downstream interposer component 125. As shown, downstream interposer component 125 may include a plurality of differential pairs 310. Differential pair 310 is similar to differential pair 210. As shown, in some implementations, downstream interposer component 125 may include 8 differential pairs 310-1 through 310-8. For example, in a 16-lane PCI-e implementation, downstream interposer component 125 may include 8 differential pairs 310. In some implementations, downstream interposer component 125 may include a different number of differential pairs 310 (e.g., 4 differential pairs, 16 differential pairs, or a different number of differential pairs). In some implementations, differential pair 310 may include a positive (e.g., P) lane and a negative (e.g., N) lane.

In some implementations, differential pair 310 may receive a signal from a particular device or input. For example, differential pair 310 may receive a signal from a receive (RX) port of PCI-e target connector 110 that is destined to a multiplexer of linear repeater 115 or interposer 100 (e.g., reference clock component 135). Additionally, or alternatively, differential pair 310 may receive a signal from another device (e.g., via a connector such as an SFF8644 connector) that is to be provided or injected to a RX port of PCI-e target connector 110 or PCI-e host connector 105.

As shown, each differential pair 310 may be associated with one or more resistors 320. For example, each lane of differential pair 310 includes a resistor 320. Resistor 320 may cause differential pair 310 to satisfy a resistance threshold of the PCI-e protocol. For example, a host PCI-e device and/or a target PCI-e device may not communicate with a device (e.g., interposer 100) that does not satisfy the resistance threshold. In some implementations, the resistance threshold may be, for example, 50 ohms. For example, the resistance of resistor 320 may be at least 50 ohms.

In some implementations, the resistance of resistor 320 may be selected to improve performance of interposer 100. For example, a resistance value that is too low may cause distortion, and a resistance value that is too high may prevent signals from propagating. In some implementations, the resistance of resistor 320 may be in a range of approximately 75 ohms to approximately 150 ohms. As a more particular example, the resistance of resistor 320 may be approximately 121 ohms. This may reduce distortion without blocking the signals entirely. In some implementations, the resistance of resistor 320 may be selected based on simulating performance of interposer 100 using different resistance values for resistor 320.

In some implementations, a differential pair 310 may not include a resistor. For example, in FIG. 3, differential pairs 310-2 and 310-8 do not include a resistor. A differential pair without a resistor may be used to inject a signal (e.g., from a signal jammer and/or the like), such as signals 165 and 185 of FIG. 1. Since the signal is injected and originates upstream from differential pair 310, no resistor is needed to enable communication with PCI-e host connector 105. This reduces cost and complexity of constructing differential pairs 310-2 and 310-8.

In some implementations, linear repeater 115 may have one or more differential pair outputs (not shown). For example, linear repeater 115 may output a signal from a multiplexer of linear repeater 115 or interposer 100 to a RX port of PCI-e host connector 105. Additionally, or alternatively, linear repeater 115 may output a signal from a RX port of PCI-e target connector 110 to another device, such as a device associated with a SFF8644 connector and/or the like.

In some implementations, downstream interposer component 125 may include additional components or circuitry, such as a power input, a control input for control data or clock information of downstream interposer component 125, a power output, a control output for control data or clock information, and/or the like.

As indicated above, FIG. 3 is provided merely as an example. Other examples are possible and may differ from what was described with regard to FIG. 3.

In this way, a resistance threshold associated with the PCI-e Gen 4 standard is satisfied in an interposer wherein linear repeaters of the interposer do not satisfy the resistance threshold. Furthermore, a resistance of the interposer may be selected in a range to improve performance of the interposer (e.g., reduce distortion and/or reduce signal attenuation). Thus, an interposer for signal measurement or injection in PCI-e Gen 4 is provided.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An interposer for a Peripheral Component Interconnect Express (PCI-e) host device and a PCI-e target device, comprising:
   a plurality of linear repeaters to perform repetition or crosspoint switching of signals en route from the PCI-e host device to the PCI-e target device or from the PCI-e target device to the PCI-e host device; and
   a plurality of interposer components,
      the plurality of interposer components to receive the signals from the plurality of linear repeaters or provide the signals to the plurality of linear repeaters,
      an interposer component, of the plurality of interposer components, including a differential pair,
      the differential pair including a first resistor coupled to a first lane of the differential pair and a second resistor coupled to a second lane of the differential pair, and
      the first resistor and the second resistor are to provide a resistance of at least 50 ohms.

2. The interposer of claim 1, where the resistance is in a range of approximately 75 ohms to approximately 150 ohms.

3. The interposer of claim 1, where the plurality of interposer components comprise:
   at least one upstream interposer component to provide the signals from a transmit port of a PCI-e host connector to a transmit port of a PCI-e target connector, and
   at least one downstream interposer component to provide the signals from a receive port of the PCI-e target connector to a receive port of the PCI-e host connector.

4. The interposer of claim 1, where each linear repeater, of the plurality of linear repeaters, is associated with a throughput of at least 16 gigatransfers per second (GT/s).

5. The interposer of claim 1, where at least one differential pair of a particular interposer component, of the plurality of interposer components, is not associated with the resistance of at least 50 ohms.

6. The interposer of claim 5, where the particular interposer component is to provide a particular signal of the signals, and where the particular signal is an injected signal.

7. The interposer of claim 1, where the signals use a PCI-e Generation 4 protocol.

8. A device, comprising:
- at least one linear repeater to provide a signal using a Peripheral Component Interconnect Express (PCI-e) Generation 4 protocol, where the signal is en route from a PCI-e host device to a PCI-e target device or from the PCI-e target device to the PCI-e host device; and
- at least one interposer component to receive the signal, where the at least one interposer component includes one or more resistors to provide a threshold resistance associated with the PCI-e Generation 4 protocol,
  - the at least one interposer component including a differential pair that includes the one or more resistors,
  - the at least one linear repeater being configured to duplicate the signal to generate a first signal and a second signal, and
  - the first signal is to be provided to the at least one interposer component and the second signal is provided to the PCI-e target device or the PCI-e host device.

9. The device of claim 8, where the threshold resistance is at least 50 ohms.

10. The device of claim 8, where the threshold resistance is in a range from approximately 75 ohms to approximately 150 ohms.

11. The device of claim 8, where the at least one interposer component includes a another differential pair to provide another signal to the at least one linear repeater.

12. The device of claim 11, where the other differential pair does not include a resistor.

13. An interposer for a Peripheral Component Interconnect Express (PCI-e) host device and a PCI-e target device, comprising:
- at least one linear repeater to perform repetition or crosspoint switching of signals en route from the PCI-e host device to the PCI-e target device or from the PCI-e target device to the PCI-e host device; and
- at least one interposer component to provide a connection between the interposer and another device,
  - the at least one interposer component to receive the signals from the at least one linear repeater or to provide the signals to the at least one linear repeater,
  - the at least one interposer component being associated with a threshold resistance associated with a PCI-e Generation X protocol, where X is greater than or equal to 4, and
  - the at least one interposer component including a differential pair that includes a first resistor coupled to a first lane of the differential pair and a second resistor coupled to a second lane of the differential pair, and
  - the first resistor and the second resistor provide a threshold resistance.

14. The interposer of claim 13, where the at least one interposer component is to provide the signals, received from the at least one linear repeater, to the other device.

15. The interposer of claim 13, where the at least one interposer component is to receive the signals, to be provided to the at least one linear repeater, from the other device.

16. The interposer of claim 13, where the threshold resistance is at least 50 ohms.

17. The interposer of claim 13, where the threshold resistance is in a range of approximately 75 ohms to approximately 150 ohms.

18. The interposer of claim 1, where the interposer component includes a second differential pair, and
- the second differential pair including a single resistor to provide resistance for both lanes of the second differential pair.

19. The device of claim 8, where the at least one interposer component includes a second differential pair, and
- the second differential pair including a single resistor to provide resistance for both lanes of the second differential pair.

20. The interposer of claim 13, where the at least one interposer component includes a second differential pair, and
- the second differential pair including a single resistor to provide resistance for both lanes of the second differential pair.

* * * * *